(12) United States Patent
Barefoot

(10) Patent No.: US 10,156,279 B2
(45) Date of Patent: Dec. 18, 2018

(54) ANNULAR VALVE

(71) Applicant: Eko Sport, Inc., Grand Junction, CO (US)

(72) Inventor: Darek C. Barefoot, Grand Junction, CO (US)

(73) Assignee: Eko Sport, Inc., Grand Junction, CO (US)

( * ) Notice: Subject to any disclaimer, the term of this patent is extended or adjusted under 35 U.S.C. 154(b) by 0 days.

(21) Appl. No.: 15/682,022

(22) Filed: Aug. 21, 2017

(65) Prior Publication Data

US 2017/0350465 A1    Dec. 7, 2017

Related U.S. Application Data

(63) Continuation-in-part of application No. 15/264,808, filed on Sep. 14, 2016, now Pat. No. 9,981,712, which is a continuation-in-part of application No. 14/465,944, filed on Aug. 22, 2014, now Pat. No. 9,731,574.

(Continued)

(51) Int. Cl.

| F16F 9/36 | (2006.01) |
| F16F 9/02 | (2006.01) |
| B62K 25/04 | (2006.01) |
| B60G 11/27 | (2006.01) |

(Continued)

(52) U.S. Cl.
CPC .............. F16F 9/368 (2013.01); B60G 11/27 (2013.01); B60G 15/12 (2013.01); B62K 25/04 (2013.01); F16F 9/0227 (2013.01); F16F 9/36 (2013.01); F16F 9/44 (2013.01); *B60G 2202/15* (2013.01); *B60G 2202/152* (2013.01); *B60G 2202/24* (2013.01); *B60G 2202/32* (2013.01); *F16F 2230/30* (2013.01)

(58) Field of Classification Search
CPC . F16F 9/368; F16F 9/0227; F16F 9/44; B62K 25/04; B60G 11/27
See application file for complete search history.

(56) References Cited

U.S. PATENT DOCUMENTS

| RE21,908 E * | 9/1941 | Beecher ................ F16F 9/3207 |
| | | 188/315 |
| 2,329,803 A * | 9/1943 | Whisler, Jr. ............ F16F 9/504 |
| | | 188/275 |

(Continued)

OTHER PUBLICATIONS

Cane Creek Double Barrel Instructions, Mar. 7, 2008, pp. 1 through 8, Cane Creek Cycling Components, Fletcher, North Carolina.

*Primary Examiner* — Thomas J Williams
*Assistant Examiner* — James K Hsiao
(74) *Attorney, Agent, or Firm* — Jason H. Foster; Kremblas & Foster

(57) ABSTRACT

A shock absorber includes a first end and a second end that reciprocate relative to one another. The shock absorber includes a gas spring chamber, a damping chamber, and a floating piston. The first side of the floating piston is in fluid communication with the gas spring chamber. The second side of the floating piston is in fluid communication with the damping chamber. The gas in the gas spring chamber applies pressure against the floating piston, which applies pressure to the substantially incompressible fluid in the damping chamber. This pressure transfer may be adequate to minimize or prevent cavitation.

17 Claims, 7 Drawing Sheets

Related U.S. Application Data

(60) Provisional application No. 61/869,095, filed on Aug. 23, 2013.

(51) Int. Cl.
*F16F 9/44* (2006.01)
*B60G 15/12* (2006.01)

(56) References Cited

U.S. PATENT DOCUMENTS

| | | | | |
|---|---|---|---|---|
| 2,356,444 A * | 8/1944 | Bound | F16F 9/063 | 267/64.15 |
| 2,531,368 A * | 11/1950 | Tack | B64C 25/60 | 267/64.26 |
| 2,599,477 A * | 6/1952 | Patriquin | F16F 9/48 | 137/493.8 |
| 2,856,035 A * | 10/1958 | Etienne Rohacs | F16F 9/003 | 139/161 F |
| 3,062,331 A * | 11/1962 | Wyman | F16F 9/3214 | 188/288 |
| 3,093,891 A * | 6/1963 | Karlgaard | F16F 9/368 | 29/445 |
| 3,470,986 A * | 10/1969 | Whisler, Jr. | F16F 9/185 | 188/269 |
| 3,706,362 A * | 12/1972 | Faure | F16F 9/3214 | 137/493.8 |
| 3,794,309 A | 2/1974 | Chrokey et al. | | |
| 4,057,236 A * | 11/1977 | Hennells | F16F 9/48 | 188/287 |
| 4,742,898 A * | 5/1988 | Lee | F16F 9/48 | 188/287 |
| 4,775,038 A * | 10/1988 | Unnikrishnan | F16F 9/3405 | 188/317 |
| 4,881,750 A * | 11/1989 | Hartmann | B62K 21/20 | 188/269 |
| 5,775,677 A | 7/1998 | Englund | | |
| 5,810,130 A | 9/1998 | McCandless | | |
| 6,135,434 A | 10/2000 | Marking | | |
| 6,260,678 B1 * | 7/2001 | Moradmand | F16F 9/348 | 188/315 |
| 6,296,092 B1 * | 10/2001 | Marking | F16F 9/0209 | 188/315 |
| 6,311,962 B1 | 11/2001 | Marking | | |
| 6,318,526 B1 * | 11/2001 | Kruckemeyer | F16F 9/362 | 188/322.17 |
| 6,981,578 B2 * | 1/2006 | Leiphart | B60G 17/08 | 137/855 |
| 7,641,028 B2 | 1/2010 | Fox | | |
| 8,123,006 B1 * | 2/2012 | Schroeder | B62K 25/08 | 188/286 |
| 9,441,698 B2 * | 9/2016 | Suzuki | F16F 9/066 | |
| 2009/0107780 A1 * | 4/2009 | Yazaki | F16F 9/092 | 188/269 |
| 2014/0054122 A1 * | 2/2014 | Coaplen | F16F 9/3257 | 188/322.13 |
| 2016/0116015 A1 * | 4/2016 | Martin | B64C 25/62 | 267/126 |

* cited by examiner

ANNULAR VALVE

CROSS-REFERENCES TO RELATED APPLICATIONS

This application claims the benefit of U.S. Provisional Application No. 61/869,095 filed Aug. 23, 2013. This application is a continuation-in-part of U.S. patent application Ser. No. 15/264,808, which was filed on Sep. 14, 2016 and is currently pending, which is a continuation-in-part of U.S. patent application Ser. No. 14/465,944, which was filed on Aug. 22, 2014 and is now U.S. Pat. No. 9,731,574. These prior applications are hereby incorporated by reference.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

The present disclosure relates generally to suspension components on vehicles. More particularly, the present disclosure relates to a shock absorber with a gas spring seal arrangement with reduced friction during compression for use on bicycles.

Reducing friction in the compression stroke may improve suspension response and allow for finer control of compression damping. These improvements are of particular interest for off-road cycling, where the combination of light component weight and suspension compliance is highly valued.

Shock absorbers that support the weight of the vehicle with compressed gas instead of coil or leaf springs may be attractive for applications where the weight of components must be kept as low as possible. Moreover, gas spring shocks may allow for convenient adjustability of the spring rate of the suspension, in some cases by increasing or decreasing the volume of gas within the shock. Both of these advantages have made gas spring shock absorbers a popular choice for mountain bikes. However, precisely because the ratio of vehicle-to-passenger weight may be low for bicycles, jounce may be transmitted efficiently and may be felt keenly by the cyclist. Where terrain is rugged, as in off-road cycling, it may be desirable for the bicycle's suspension to be as responsive as possible. The difference in responsiveness between gas-sprung and coil-sprung shocks has proven great enough to limit the use of gas-sprung shocks in off-road cycling.

Turning to FIGS. 1-4, a conventional gas spring shock may be seen. A conventional gas spring shock absorber 10 for lightweight vehicles, including bicycles, employs a piston 16 with a gas seal 35 that engages a cylinder 12. As the seal 35 on the piston 16 moves against the wall of the cylinder 12 during compression, the gas trapped in a compression chamber 22 between the seal 35 and the closed end 32 of the cylinder 12 offers progressively greater resistance to compressive movement as a simple function of rising pressure against the sectional area of the piston 16 and seal 35. Secondarily, this rising gas pressure causes the piston seal 35 to press with progressively greater force against the cylinder 12. The frictional adhesion of the seal 35 to the cylinder wall must be overcome before the shock absorber 10 will compress, decreasing responsiveness.

If an o-ring seal (not shown) is used on the piston of a conventional gas spring design, the contact area of the seal with the cylinder surface will be relatively large. The area of o-ring contact varies with pressure in the gas spring chamber, since pressure forces the o-ring axially toward one end of its gland and into conformity with the square-cornered sectional profile formed by the gland and cylinder wall. The relatively large contact patch of the o-ring under pressure adds significantly to the adhesion of the seal to the cylinder.

A u-cup or "X"-section seal (as shown in FIGS. 1-4) will have a smaller area of contact with the cylinder compared to an o-ring. However, in order to contain gas pressure reliably, the projecting lip 35a of such a seal must be angled toward the cylinder in the direction of compression and in the direction of its own movement in relation to the dynamically sealed surface. The angular abutment of the seal lip against the cylinder wall 12 drives the pressure of the seal material at the contact patch to high values during compression. The chisel-action of the seal lip creates significant adhesion of the seal material to the cylinder wall, partially offsetting the advantage of a smaller area of contact as compared with an o-ring.

The need therefore exists for a gas spring shock absorber with reduced adhesion of the dynamic gas containment seal during the compression stroke, thereby improving responsiveness.

Further, in some prior embodiments, cavitation may occur in the damping portion of the shock absorber. The occurrence of cavitation creates a less desirable, rougher ride. Accordingly, the need exists for a shock absorber where gas pressure may be used to minimize or eliminate cavitation by increasing pressure on the substantially incompressible fluid in a damping chamber.

BRIEF SUMMARY OF THE INVENTION

In one embodiment, a shock absorber for a vehicle includes a first end, a second end, and a dynamic gas seal. The first end may have an interior wall and may be adapted to be mounted to one of the frame and a first wheel of the vehicle. The second end may be reciprocally and slidably mounted to the first end. The second end may be adapted to be mounted to the other of the frame and the first wheel of the vehicle. A substantially gas-tight interior gas spring chamber may be defined between the first end and the second end. Gas pressure in the interior gas spring chamber may bias the first end and the second end away from one another. The dynamic gas seal may be attached to the first end. The dynamic gas seal may have at least one lip engaging the second end, thereby creating a substantially gas-tight barrier between the first end and the second end. Movement of the plunger into the interior gas spring chamber may reduce the size of the interior gas spring chamber by compressing gas in the chamber. This decrease in the interior volume of the interior gas spring chamber may cause the gas pressure in the interior gas spring chamber to rise in proportion to the decreased volume. Movement of the plunger out from the interior gas spring chamber may increase the size of the interior gas spring chamber and diminish the pressure on gas in the chamber. This increase in the interior volume of the interior gas spring chamber may cause the gas pressure in the interior gas spring chamber to fall in proportion to the increased volume. The dynamic gas seal may be the only dynamic seal attached between the first end and the second end and capable of creating a substantially gas-tight barrier between the first end and the second end.

The dynamic gas seal may further include a base portion disposed at a free end of the first end. The at least one lip of the dynamic gas seal may extend both radially and axially away from the base portion. The at least one lip may also sealingly contact the outer surface of the second end. Friction between the at least one lip and the second end may be lower when the plunger moves into the interior gas spring chamber than when the plunger moves out from the interior gas spring chamber. The at least one lip may extend axially farther than it does radially.

The vehicle may be a bicycle. The shock absorber may further include a hydraulic damper defined substantially within the second end. The hydraulic damper may further include a damper chamber within the second end. Air pressure from the interior gas spring chamber may pressurize fluid within the damper chamber. The hydraulic damper may further dampen movement of the plunger.

A suspension system may include a first suspension element, a second suspension element, and a dynamic seal. The first suspension element may include an interior wall. The second suspension element may be capable of reciprocating relative to the first suspension element and may have an exterior wall that slidingly interfits with and is capable of reciprocating relative to the first suspension element. The dynamic seal may have at least one lip and may minimize the escape of gas from within an interior gas chamber defined between the first suspension element and the second suspension element. The dynamic seal may be mounted on the first suspension element. The dynamic seal may be the only dynamic seal fixed to the first suspension element and capable of creating a substantially fluid-tight barrier between the first suspension element and the second suspension element. The interior wall of the first suspension element may fit closely with the exterior wall of the second suspension element regardless of the reciprocal position of the first suspension element relative to the second suspension element. The interior wall of the first suspension element may have a consistent circumference along its length.

The dynamic seal may further include a base portion disposed at a free end of the first suspension element. The at least one lip of the seal may extend both radially and axially away from the base portion. The at least one lip may sealingly contact an exterior wall of the second suspension element. Friction between the at least one lip and the second suspension element may be lower when the two suspension elements move relatively in one direction than when the two suspension elements move relatively in a second direction. The at least one lip may extend axially farther than it does radially.

The vehicle may be a bicycle. The suspension system may further include a hydraulic damper defined substantially within the second suspension element. The hydraulic damper may further include a damper chamber within the second suspension element. Air pressure from the interior gas chamber may pressurize fluid within the damper chamber. Fluid pressure from the damper chamber may pressurize air from the interior gas chamber.

In one embodiment, a shock absorber for a vehicle includes a first end, a second end, a first piston, a second piston, and a floating piston. The first end may be annular along at least a portion of its length and may terminate at a first cap. The first end may at least partially define a gas spring chamber containing gas. The second end may be annular along at least a portion of its length and may terminate at a second cap. The first end and the second end may be configured to telescopically slidingly interfit with one another. The second end may at least partially define a damping chamber containing a substantially incompressible fluid. A first piston may be disposed in fixed relationship to the second end. Movement of the first piston within the first end may affect the gas in the gas spring chamber. A second piston may be disposed in fixed relationship to the first end. Movement of the second piston within the second end may affect the substantially incompressible fluid in the damping chamber. A floating piston may have a first side and a second side. The first side of the floating piston may be in fluid communication with the gas in the gas spring chamber and the second side of the floating piston may be in fluid communication with the substantially incompressible fluid in the second chamber. The vehicle may be a bicycle.

The floating piston may be substantially disc shaped. The floating piston may be positioned within the second end.

The floating piston may be substantially annular. The floating piston may surround a shaft attached to the first end. The second piston may be attached to the shaft.

The damping chamber may include a first cylindrical chamber, a second cylindrical chamber and an annular chamber. The damping chamber may be configured with a first valve allowing the substantially incompressible fluid to flow from the cylindrical chamber to the annual chamber during a compression stroke. The damping chamber may be configured with a second valve allowing the substantially incompressible fluid to flow from the cylindrical chamber to the annual chamber during a rebound stroke. The second valve may be substantially annular. The second cylindrical chamber may be adjacent the floating piston.

The gas spring chamber may include a first cylindrical chamber, a second cylindrical chamber, and an annular chamber. The annular chamber may allow passage of gas between the first cylindrical chamber and the second cylindrical chamber. The second cylindrical chamber may be adjacent the floating piston.

The floating piston may be configured to transmit pressure from the gas in the gas spring chamber to the substantially incompressible fluid in the damping chamber. The pressure from the gas in the gas spring chamber against the floating piston may be adequate to minimize cavitation.

Figure 1:
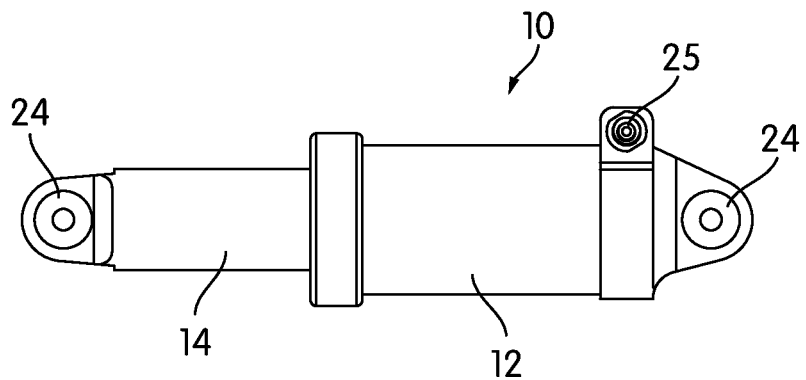
FIG. 1 is a side view of a prior art gas spring for a vehicle suspension.
Figure 2:
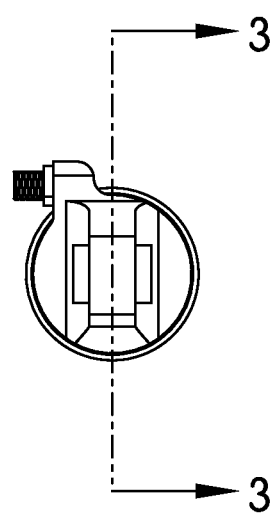
FIG. 2 is an end view of the spring of FIG. 1.
Figure 3:
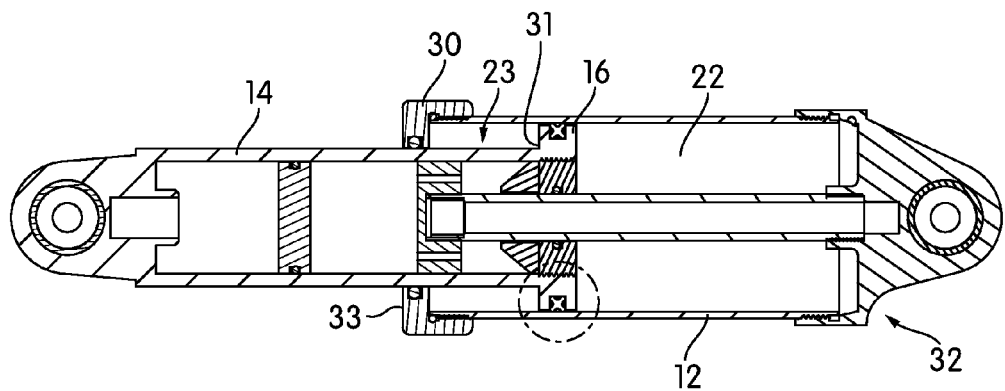
FIG. 3 is a cross-sectional view of the spring of FIG. 1 taken along line 3-3 of FIG. 2.
Figure 4:
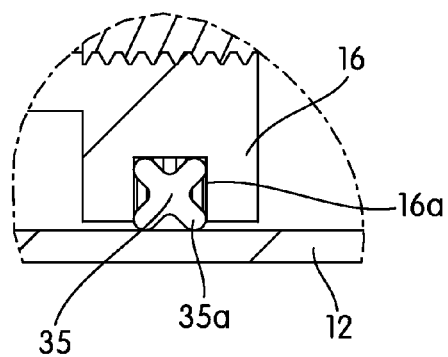
FIG. 4 is a detailed view of the area shown by a dashed circle in FIG. 3.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

In this detailed description, various terms relating to direction may be used. The elements discussed herein relate to a bicycle. Because, in its operable position, a bicycle is oriented generally vertically, i.e., perpendicular to the ground, the direction terms refer to the position of an element relative to gravity when the bicycle is in its operable position. Accordingly, for example, the term "downwardly" refers to the direction towards the ground when the bicycle is in its operable position, and the term "forwardly" relates to a direction towards a front wheel of the bicycle when it is in its operable position. Further, the terms "inboard" and "outboard" may be used. The term "inboard" describes a position between one item and a vertical plane substantially bisecting the bicycle. The term "outboard" describes a position of an object further from the vertical centerplane of the bicycle. In addition, the terms "bicycle" and "bike" are used herein interchangeably. A person having ordinary skill in the art will understand that if something is referred to as one, it can refer to the other.

In the present disclosure, the suspension structure may be described as it relates to a bicycle. However, the suspension structure described in the present embodiments may instead be applied to other vehicles. The present suspension structure may be used with vehicles having a different number of wheels, for example. The suspension structure may be used in connection with a motorized vehicle.

The present embodiments may reduce seal adhesion in a gas spring shock absorber. In some embodiments, the gas-compressing element may be a plunger or large-diameter blind rod slidingly engaging a seal contained in the cylinder. The lip of the u-cup that forms the dynamic gas containment seal may be angled toward the gas spring chamber so that rising pressure pushes the seal progressively harder against the surface of the plunger, but because the plunger surface moves compressively in the same direction in which the lip of the seal is biased, there is no accompanying chisel-action of the seal lip to compound the pressure at the contact patch and contribute undesirably to adhesion. By eliminating a structural contributor to seal adhesion ("stiction"), the present invention may be more responsive to bumps than is a conventional gas spring shock absorber.

Figure 5:
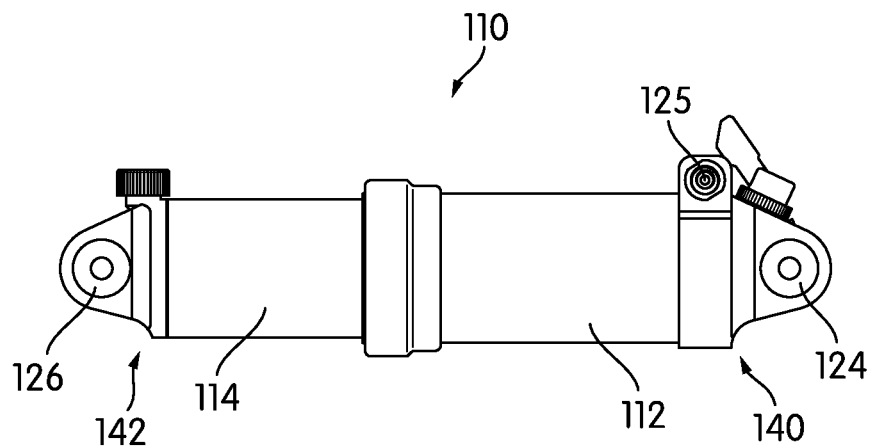
FIG. 5 is a side view of one embodiment of a vehicle suspension according to the present disclosure.
Figure 6:
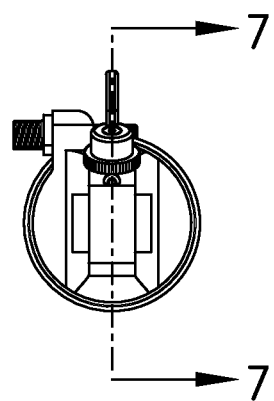
FIG. 6 is an end view of the suspension of FIG. 5.

Turning now to FIG. 5, a shock absorber or suspension system 110 may be seen. The suspension system 110 may have a first housing member, portion or end 112 and a second housing member, portion or end 114. A first eye hole 124 may extend from a closed end 140 of the first portion 112. A second eye hole 126 may extend from a closed end 142 of the second portion 114. In some vehicles, one of the first eye hole 124 and the second eye hole 126 may be directly or indirectly secured to a vehicle frame (not shown) in conventional fashion. The other of the first eye hole 124 and the second eye hole 126 may be secured directly or indirectly to a vehicle wheel (not shown) in conventional fashion.

Figure 7:
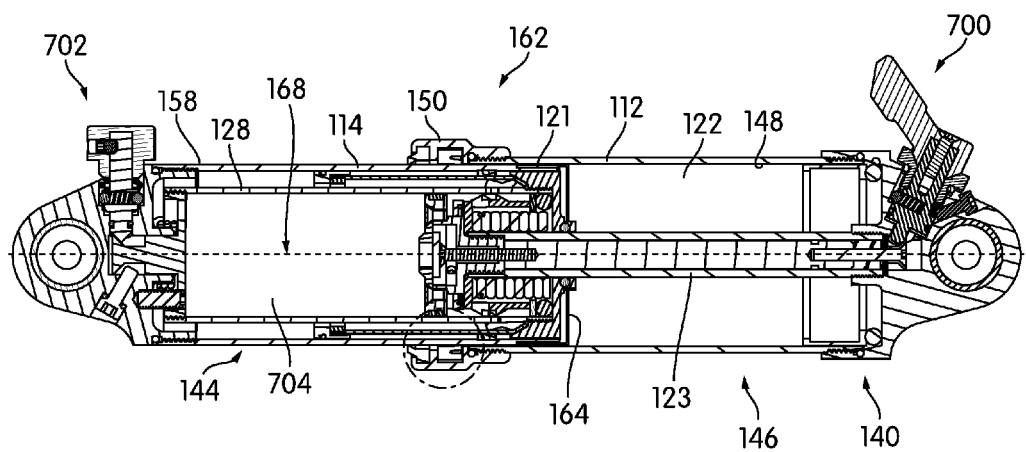
FIG. 7 is a cross-sectional view of the suspension of FIG. 5 taken along line 7-7 of FIG. 6.

As may be seen most clearly in FIG. 7, the suspension system may include two components. The first is a conventional hydraulic damping portion 144 and an air spring portion 146. While various components are illustrated of the hydraulic damping portion 144, these components are relatively conventional. Many other configurations of hydraulic damping may be substituted therefor by a designer or other person having ordinary skill in the art. Accordingly, these components are not further described in detail.

Turning now to the air spring portion 146, it may be seen that the first portion 112 may include an inner wall 148 and the second portion 114 may include an outer wall 158. The inner wall 148 and the outer wall 158 may be configured to be of similar shape and size, while allowing the inner wall 148 and the outer wall 158 to slidingly interfit with one another to allow the first portion 112 and the second portion 114 to reciprocate relative to one another.

The first portion 112 may terminate in a free end 162. The free end 162 may be open to allow the insertion of the second portion 114. The second portion 114 may terminate in a plunger or other closed end structure 164. An interior gas spring chamber 122 may be defined between the first portion 112 and the second portion 114. The gas spring chamber 122 may be defined between the inner wall 148 of the first portion 112 and the plunger 164. The gas spring chamber 122 may be filled with any desirable gas through a conventional port to a desired pressure level. The pressure in the gas spring chamber 122 may desirably be selected to be sufficient to bias the plunger 164 away from the closed end 140 of the first end 112, thereby biasing the first end 112 and second end 114 relatively away from one another.

When the wheel of the vehicle encounters an obstacle, the impact may be at least partially absorbed by the suspension element 110. The impact may cause the plunger 164 to move toward the closed end 140 of the first portion 112. This movement may reduce the size of the gas chamber 122, thereby causing the gas in the gas chamber 122 to compress and increasing the gas pressure in the chamber 122 in proportion to the reduction in the interior volume of the chamber 122 caused by the plunger. Upon removal of the impact force, the gas pressure force may exceed the impact force and move the plunger 164 away from the closed end 140 of the first portion 112. This movement may cause an increase in the size of the gas chamber 122 and a decrease in the gas pressure in the chamber 122 in proportion to the increase in the interior volume of the housing by the plunger 164.

In many embodiments, it is desirable for there to be only one gas spring chamber. In contrast to the prior art embodiment shown in FIGS. 1-4, no supplemental chamber is used between the plunger 16 and the cap 30. In the prior art embodiment, there is included an outward-facing flange 31 on the second portion 14 and an inward-facing flange 33 on the first portion 12. This set of flanges cooperated to create a first gas cylinder 22 and a second gas cylinder 23. The second gas cylinder 23 is often used to oppose extension of the first and second portions relative to one another. It is also noted that in such a design, there are two dynamic seals used between the first portion 12 and the second portion 14. One dynamic seal is attached to the first portion 12 on its inward-facing flange 33 and contacts the outer surface of the second portion 14. A second dynamic seal is attached to the second portion 14 on its outward facing flange 31 and contacts the inner surface of the first portion 12.

In the present embodiment, instead of including cooperating flanges, there may be no need for a secondary gas cylinder. The outer circumference of the second portion 114 may be substantially the same along its length. Similarly, the inner circumference of the first portion 112 may be substantially the same along its length. This close fit may allow for a minimum of binding between the parts.

Other features of the device are also conventional and are illustrated. For example, in FIG. 7, there is illustrated a structure 700 that allows for adjustment of air pressure within the air chamber 122. This structure 700 may incorporate a variety of static seals that may serve to contain air pressure within the interior gas chamber 122. Similarly, there is illustrated a structure 702 that allows for adjustment of hydraulic pressure within the damper chamber 704. This structure 702 may also incorporate a variety of static seals that may serve to contain air pressure within the damper chamber 704.

Figure 8:
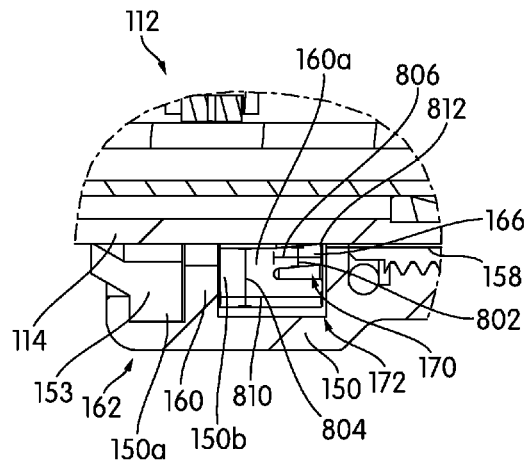
FIG. 8 is a detailed view of the area shown by a dashed circle in FIG. 7.

Turning now to FIG. 8, a more detailed view may be seen of the seal 150*b* that is attached and extends between the first portion 112 and the second portion 114. The seal 150*b* may include a base portion 160*a* that may be inserted into or otherwise secured to a finger 160 disposed at or adjacent the free end 162 of the first end 112. The seal 150*b* may further include at least one lip portion 166 that extends both axially (along the axis 168 of the suspension system 110) and radially (towards the axis 168 of the suspension system 110). In some embodiments, it may be desirable for the at least one lip portion 166 to extend axially a greater distance than it extends radially. The seal 150*b*, and in many embodiments, the lip portion 166, may be configured to sealingly engage the outer surface 158 of the second portion 114. The use of such a seal may minimize the escape of gas from the gas spring chamber 122. The lip portion 166 may have a thickness 802 and the base 160*a* may have a thickness 804. The thickness 802 of the lip portion 166 may be less than about half of the thickness 804 of the base 160*a*. The lip portion 166 may have a length 806, and the base 160*a* may have a length 810. The length 806 of the lip portion 166 may be less than about half of the length 810 of the base 160*a*. In many embodiments, it may be desirable for a free end 812 of the lip portion 166 to engage the second housing member 114. In many embodiments, the lip portion 166 may be axially deformable to allow axial movement, particularly of the free end 812 towards and away from the axis 168.

Figure 9:
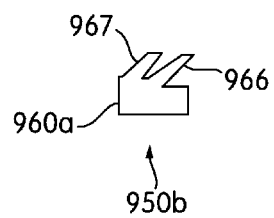
FIG. 9 is a side view of another embodiment of a dynamic gas seal.

An alternative embodiment of the seal may be seen in FIG. 9. FIG. 9 illustrates a seal 950*b* that has a base portion 960*a*. The seal 950*b* also includes a first lip 966 and a second lip 967. As may be seen in FIG. 9, the first lip 966 and the second lip 967 may be of similar size and shape and may project from the base portion at substantially the same angle. However, a designer may choose to vary the thickness and angle of protrusion of each of the lips 966, 967 away from the base portion 960*a*. The lips may each extend both radially and axially from the base portion and may extend the same or different lengths radially and axially. Further, any number of lips may be used instead of those illustrated in FIGS. 5-10. The embodiments shown are merely exemplary.

The configuration of the seal 150*b* in FIG. 8 may allow for improved relative reciprocation of the first portion 112 and the second portion 114. When the first portion 112 moves towards the second portion 114 (reducing the size of the gas spring chamber 122), the lip portion may deform in an inward direction relative to the axis 168 (away from the second portion 114) and minimize the surface area of the seal that contacts the second portion 114. This inward deformation may cause the seal to take a chisel shape that may allow for adequate containment of the gas. In the orientation shown in FIG. 8, the compression stroke will involve the first end or portion 112 moving towards the left, towards the second end or portion 114. As may be apparent, when the first end 112 moves towards the second end, the lip portion 166 may deform outwardly and partially into the cavity 170 within the seal 150*b*. This deformation may minimize contact and friction between the seal 150*b* and the outer surface 158 of the second end 114. This deformation may allow the compression stroke to occur with a minimum of friction between the seal 150*b* and the second end 114.

However, during the rebound stroke, the seal 150*b* has an opposite effect. When the first end 112 moves away from the second end 114 (towards the right in FIG. 8), the lip portion 166 may move inwardly (towards the axis 168). This inward movement may create an increased drag or friction between the seal 150*b* and the second end 114. This friction may prevent or minimize the effects of premature rebound of the shock absorber.

The precise design of the seal 150*b* and its attachment to the first end 112 may be modified by a person having ordinary skill in the art. While the seal 150*b* is attached to a finger 160 adjacent a dust guard (wiping seal) 153 at the free end 162 of the first end 112, this structure may be modified. For example, the finger 160 may be configured differently. The finger 160 may be thicker or thinner than that shown. It may be positioned at a different angle relative to the axis 168. It may be curved or have any other desirable profile.

The seal 150*b* may be secured adjacent the free end 162 in a number of different ways. The seal 150*b* may be affixed to the first end 112 by an adhesive. Alternatively, it may be positioned within a cavity, such as the cavity 172, without any adhesive. Alternatively, it may be secured with a fastener. Other methods and structures for attaching or securing the seal 150*b* in or to the first end 112 are within the capabilities of a person having ordinary skill in the art.

The relative size and shape of the seal 150*b* and the apparatus as a whole may also be modified by a person having ordinary skill in the art. A designer will be able to modify the size and shape of the seal 150*b*, along with the extents of its axial and radial extensions in order to produce a desired friction. Further, the seal 150*b* may be made from a variety of materials capable of substantially producing a seal to enclose air within the shock absorber 110. A designer is able to select an appropriate material to provide an appropriate durability, adhesion, and friction, based on the designer's criteria. In some embodiments, the material may be selected from nitrile, polyurethane, and fluorocarbon. In some embodiments, the material of the seal may have a Shore A hardness between about 60 and about 90.

In many embodiments, the dynamic seal 150*b* may be the only dynamic seal attached to the first end 112 capable of creating a substantially fluid-tight barrier between the first end 112 and the second end 114. Other seals may, of course be present and may be attached to the first end 112. For example, the dust wiping seal 153 may also be secured adjacent a free end 162 of the first end 112. However, the dust wiping seal 153 is not capable of creating a substantially fluid-tight seal between the first end 112 and the second end 114, due to its orientation and purpose. As also noted above, there may be static seals elsewhere in the design that may be attached to the first end 112 and that may contribute to the creation of a substantially gas-tight chamber 122. As will be described below in connection with FIG. 10, there may be some embodiments where a passageway is created through or around the plunger 164 to create an interaction between the interior gas spring chamber 122 and the damper chamber 704. In such embodiments, additional dynamic seals may be incorporated into the design. However, these dynamic seals are not attached directly to the first end 112 and do not serve to create a substantially gas-tight barrier directly between the first end 112 and the second end 114. Accordingly, such other seals are attached differently and may serve very different purposes than that of the dynamic gas seal 150b.

The remaining features of the design may also be modified as a designer wishes. The present embodiments may be used with a variety of hydraulic dampers. The design shown may be modified in a variety of ways known to a designer of ordinary skill to achieve the desired damping characteristics.

Figure 10:
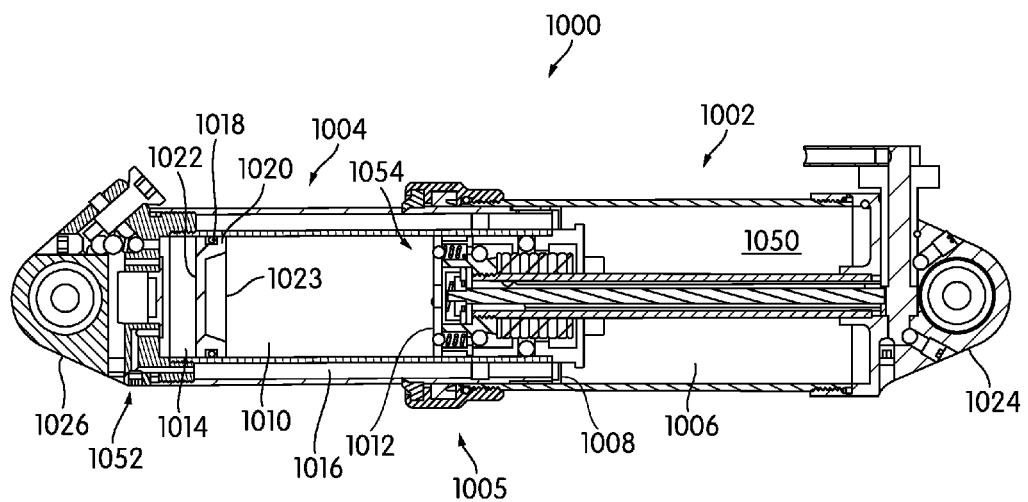
FIG. 10 is a cross-sectional view of an alternative embodiment of the suspension.

For example, an alternative embodiment is shown in FIG. 10. In the alternative shock absorber or suspension system 1000 illustrated in FIG. 10, there is a first end 1002 and a second end 1004. The dynamic sealing structures 1005 and overall configuration are substantially the same as those described above in connection with FIGS. 5-8 and this description will not be repeated here. However, FIG. 10 illustrates a further feature that may be incorporated.

FIG. 10 illustrates an interior gas spring chamber 1006 defined substantially within the first end 1002 and further bounded by a plunger 1008. The suspension system 1000 further includes a hydraulic damping chamber 1010 defined substantially within the second end 1004 and further bounded by a piston 1012. In some embodiments, it may be desirable to incorporate a secondary gas chamber 1014 adjacent the hydraulic damping chamber 1010 and fluidly connected to the interior gas spring chamber 1006 by a gas passageway 1016. A floating ring 1020 may be positioned between the secondary gas chamber 1014 and the hydraulic damping chamber 1010 to separate the gas and the hydraulic fluid and to allow force to be mutually created between the gas and the hydraulic fluid. In many embodiments, it may be desirable to incorporate one or more seals 1018 on the floating ring within the second end 1004 to minimize interaction between the gas and the hydraulic fluid. When a vehicle, such as a bicycle, encounters an obstacle, the first end 1002 and the second end 1004 move relatively toward one another, i.e., the free end 1024 of the first end 1002 moves left as illustrated and the free end 1026 of the second end 1004 moves right as illustrated. This movement causes the plunger 1008 to compress the gas in the interior gas chamber 1006 and the plunger 1012 to compress the fluid within the damper chamber 1010. Upon such movement, the gas under pressure flows into the interaction chamber 1014 and presses on a first side 1022 of the floating ring 1020. Similarly, pressure from the hydraulic fluid in the damper chamber 1010 presses on a second and opposite side 1023 of the floating ring 1020. This pressure from each side serves to damp movement of the piston and the plunger. Accordingly, fluid pressure from the damper chamber 1010 may damp movement of the plunger 1008 into the gas chamber 1006 and gas pressure from the gas chamber 1006 may damp movement of the piston 1012 into the damper chamber 1010. The inclusion of such an interaction chamber may, therefore, allow for better tuning of compression and rebound of the shock absorber 1000.

Figure 11:
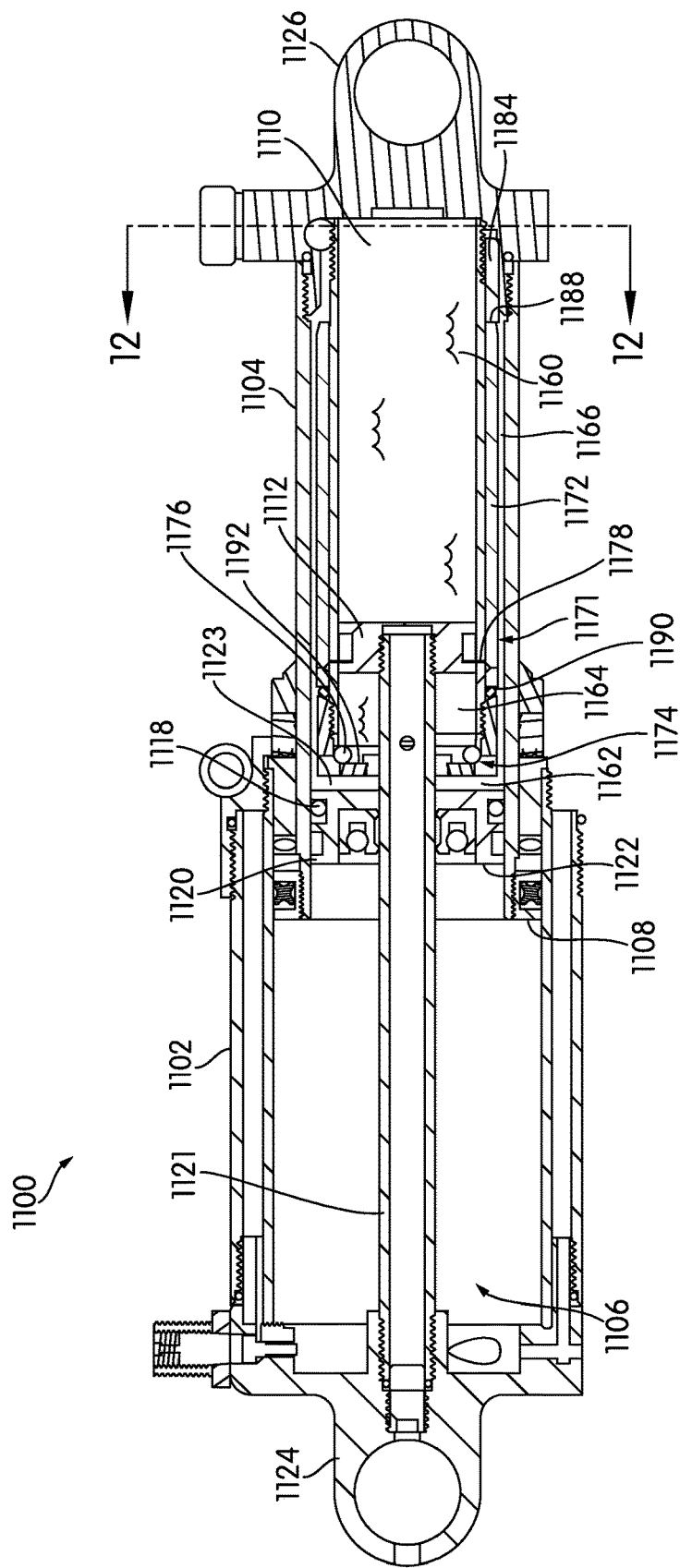
FIG. 11 is a cross-sectional view of another alternative embodiment of the suspension.

FIGS. 10 and 11 may be compared to demonstrate different ways a shock absorber can be configured to permit a beneficial interaction between a gas spring chamber and a damping chamber. In both embodiments, gas from the gas spring chamber is in fluid communication or contact with one side of a floating piston. Substantially incompressible fluid from the damping chamber is in fluid communication or contact with an opposite side of the floating piston. In this manner, pressure from the gas in the gas spring chamber can be used to pressurize the substantially incompressible fluid in the damping chamber, thereby, among other things, minimizing or preventing vacuum bubbles within the substantially incompressible fluid.

As previously described, the shock absorber 1000 in the embodiment of FIG. 10 may include a first end 1002 and a second end 1004. The first end 1002 and the second end 1004 are configured to slidingly interfit with or be telescopic with one another. The first end 1002 may be annular along at least a portion of its length and may terminate in a first cap. The first cap may include an eye 1024 that may be used to secure the first end 1002 to a vehicle (not shown). The first end 1002 may at least partially define a positive gas spring chamber 1006. The gas spring chamber 1006 may be filled with gas to a conventional pressure in a conventional manner. The second end 1004 may be annular along at least a portion of its length and may terminate in a second cap. The second cap may include an eye 1026 that may be used to secure the second end 1004 to a different portion of a vehicle (not shown). The second end 1004 may at least partially define a damping chamber 1010. Upon compression, a first piston 1008 secured or otherwise disposed in a fixed relationship to the second end 1004 may move towards the first end 1002. This movement of the first piston 1008 may affect the gas in the gas spring chamber 1006. In many embodiments, the movement of the first piston 1008 may compress the gas in the positive gas spring chamber 1006. Simultaneously, a second piston 1012 secured or otherwise disposed in a fixed relationship to the first end 1002 may move towards the second end 1004. This movement of the second piston 1012 towards or within the second end 1004 may affect the substantially incompressible fluid in the damping chamber 1010. In many embodiments, the movement of the second piston 1012 may create a displacement of oil or other incompressible fluid in the damping chamber 1010. This oil displacement is done in a conventional manner with valving in the piston or in the second end 1004 to allow the substantially incompressible fluid to move from one damping chamber to the other.

The shock absorber 1000 may further include a floating ring or piston 1020 having a first side 1022 and a second side 1023. Gas in fluid communication with the positive gas spring chamber 1006 may be capable of contacting the first side 1022 of the floating piston 1020. Substantially incompressible fluid in fluid communication with the damping chamber 1010 may be capable of contacting the second side 1023 of the floating piston 1020. The floating piston 1020 may be responsive to the relative pressures of the gas in the positive gas spring chamber 1006 and of the substantially incompressible fluid in the damping chamber 1010 and may be permitted to move to maintain the pressures substantially in equilibrium.

As shown in FIG. 10, the air spring chamber 1006 may include a first substantially cylindrical chamber 1050, a secondary chamber or interaction chamber or second substantially cylindrical gas chamber 1014, and an annular chamber 1016. Additional chambers or passageways may be included in fluid communication between these chambers, if desired or deemed appropriate by a person having ordinary skill in the art, such as the passageways 1052. Gas within the gas spring chamber 1006 is permitted to move without restriction between the first substantially cylindrical chamber 1050, the second substantially cylindrical gas chamber 1014, and the annular chamber 1016. In many embodiments, such as the illustrated embodiment, gas may flow freely between the chambers and passageways. In other embodiments, one or more valves may be incorporated within the gas spring chamber 1006. Gas within the second cylindrical gas chamber 1014 may be in contact with one side of the floating piston 1020, such as the first side 1022 as illustrated in this embodiment.

During a compression stroke, the first end 1002 and the second end 1004 may telescopically slide towards one another. The first piston 1008 may move into the gas spring chamber 1006. This motion of the first piston 1008 may cause gas to move between the sub-chambers of the gas spring chamber 1006 and may also increase the pressure in the gas spring chamber 1006. This fluid movement and pressure increase may increase the pressure of the gas in the second cylindrical chamber 1014 against the first side 1022 of the floating piston 1020. At the same time, the second piston 1012 may move into the damping chamber 1010. The movement of the second piston 1012 may cause the opening of a valve within the second piston 1012 to create a damping of the movement of the shock absorber 1000. Such valving and damping is well known by persons having ordinary skill in the art and is not further described in detail. One embodiment of relevant valving is shown in FIG. 10 and identified as 1054. The pressure applied by the gas in the gas spring chamber 1006 to the floating piston 1020 may minimize or prevent vacuum bubbles from forming (i.e., cavitation) in the fluid of one or more damping chambers 1010 as the second piston 1012 moves during extension and compression of the shock absorber 1000. The prevention of vacuum bubbles in the damping fluid may be desirable to maintain a substantially consistent damping force, as is known in the art. In addition, varying the gas pressure within the gas chamber 1006 may vary the tension on the seal 1018 of the floating piston 1020 that may be overcome in order for the floating piston 1020 to move and permit the shock absorber 1000 to compress. In this manner, gas pressure from the gas spring chamber 1006 may be used to affect the damping of the shock movement.

A person having ordinary skill in the art and a related user can easily adjust the shock absorbing and damping characteristics of the shock absorber 1000 merely by adjusting the air pressure within the gas spring chamber 1006. There is an interrelationship between the pressure in the gas spring chamber 1006 and the pressure in the damping chamber 1010 through the equalizing effect and movement of the floating piston 1020 (as will be described in greater detail below). Accordingly, by adding or removing gas from the gas spring chamber 1006 alone, the damping characteristics will also change as described above. This interrelationship, particularly by allowing adjustment of the pressure of the gas in the gas spring chamber 1006 through a conventional Schrader valve open to the gas spring chamber 1006, may allow a user to easily adjust these characteristics.

Figure 12:
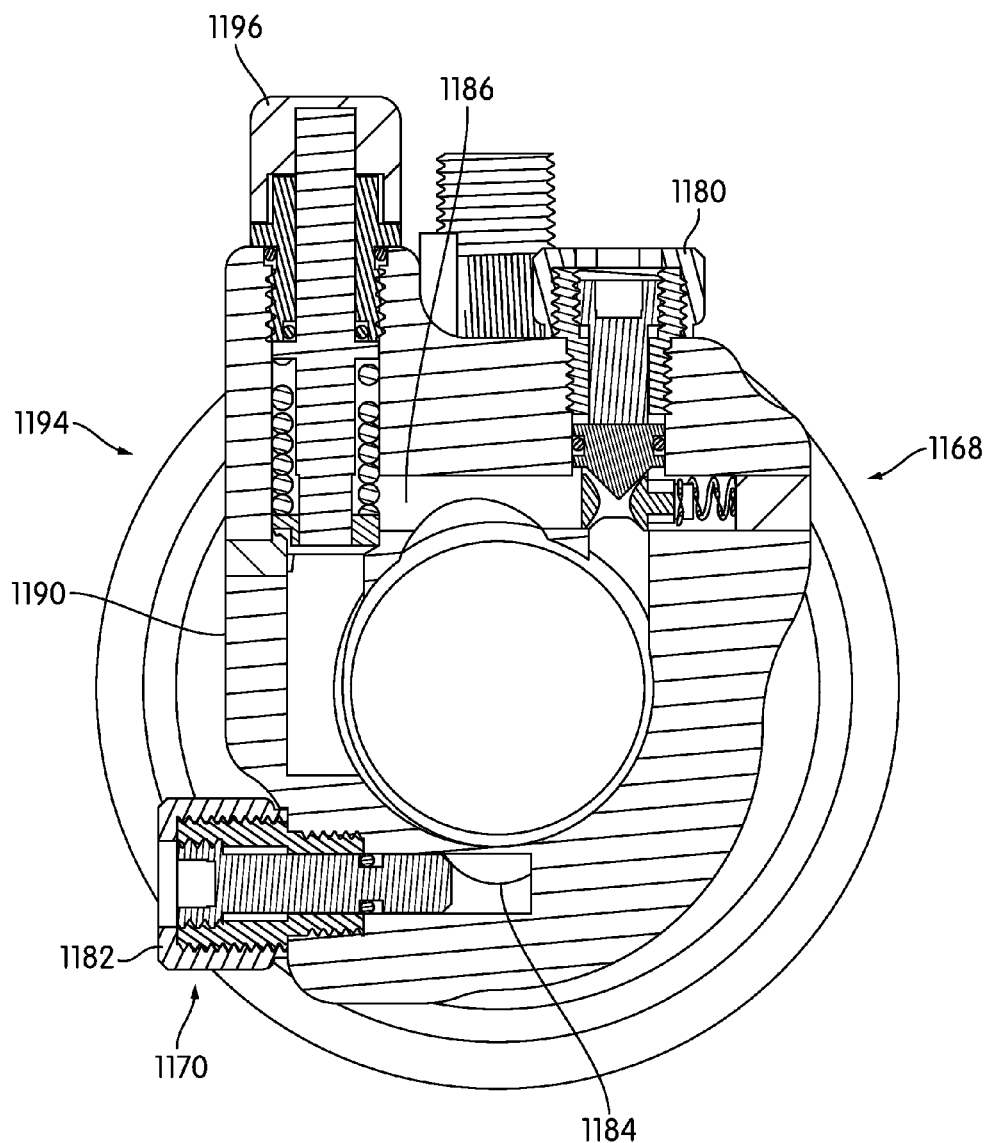
FIG. 12 is a cross-sectional view of the embodiment of FIG. 11 taken on line 12-12 of FIG. 11.

A similar configuration may be seen in FIGS. 11 and 12. The shock absorber 1100 in the embodiment of FIG. 11 may include a first end 1102 and a second end 1104. The first end 1102 and the second end 1104 may be configured to slidingly interfit with or be telescopic with one another. The first end 1102 may be annular along at least a portion of its length and may terminate in a first cap. The first cap may include an eye 1124 that may be used to secure the first end 1102 to a vehicle (not shown). The first end 1102 may at least partially define a positive gas spring chamber 1106. The gas spring chamber 1106 may be filled with gas to a conventional pressure in a conventional manner. The second end 1104 may be annular along at least a portion of its length and may terminate in a second cap. The second cap may include an eye 1126 that may be used to secure the second end 1104 to a different portion of a vehicle (not shown). The second end 1104 may at least partially define a damping chamber 1110. Upon compression, a first piston 1108 secured or otherwise disposed in a fixed relationship to the second end 1104 may move towards the first end 1102. This movement of the first piston 1108 may affect the gas in the gas spring chamber 1106. In many embodiments, the movement of the first piston 1108 may compress the gas in the positive gas spring chamber 1106. Simultaneously, a second piston 1112 secured or otherwise disposed in a fixed relationship to the first end 1102 may move towards the second end 1104. This movement of the second piston 1112 towards or within the second end 1104 may affect the substantially incompressible fluid in the damping chamber 1110. In many embodiments, the movement of the second piston 1112 may create a displacement of oil or other incompressible fluid in the damping chamber 1110. This oil displacement may be done in a conventional manner with valving in the piston or in the second end 1104 to allow the substantially incompressible fluid to move from one damping chamber to the other.

The shock absorber 1100 may further include a floating piston 1120 having a first side 1122 and a second side 1123. The floating piston 1120 may be annular and may surround a portion of a shaft 1121. The second piston 1112 may be secured to the shaft 1121. The shaft 1121 may also be attached to the first end 1102. Gas in fluid communication with the positive gas spring chamber 1106 may be capable of contacting the first side 1122 of the floating piston 1120. Substantially incompressible fluid in fluid communication with the damping chamber 1110 may be capable of contacting the second side 1123 of the floating piston 1120. The floating piston 1120 may be responsive to the relative pressures of the gas in the positive gas spring chamber 1106 and of the substantially incompressible fluid in the damping chamber 1110 and may be permitted to move to maintain the pressures substantially in equilibrium.

As shown in FIG. 11, the damping chamber 1110 may include a first cylindrical chamber 1160, a second cylindrical chamber 1162, a third cylindrical chamber 1164 and an annular chamber 1166. The damping chamber 1110 may include a first port 1186 and a first valve 1168 and a second valve 1194 that may govern fluid flow between the first cylindrical chamber 1160 and the annular chamber 1166, as best shown in FIG. 12. This first port 1186 may permit the substantially incompressible fluid to flow in either direction between the first cylindrical chamber 1160 and the annular chamber 1166. The first valve 1168 may permit fluid to flow from the first cylindrical chamber 1160, through the first port 1186 and into the annular chamber 1166 when pressure or force from the incompressible fluid in the first cylindrical chamber 1160 exceeds any necessary force threshold within the valve 1168. In some embodiments, features of the valve 1168 may extend beyond the exterior surface 1190 of the second end 1104 and may be manipulable by the user via a knob or other structure 1180 to adjust the pressure at which the substantially incompressible fluid may flow through the first port 1186 from the first cylindrical chamber 1160 to the annular chamber 1166. In some available positions of the adjustment structure 1180, the necessary pressure to open the first valve 1168 may be, or may approach, zero. In some embodiments, the valve 1168 may permit fluid to freely flow through the first port 1186 from the annular chamber 1166 into the first cylindrical chamber 1160, so that the valve may restrict flow in only one direction. In some embodiments, the valve 1168 may be a controllable plain orifice valve in the direction from the first cylindrical chamber 1160 to the annular chamber 1166 and a sprung valve in the direction from the annular chamber 1166 to the first cylindrical chamber 1160.

The second valve 1194 may also permit fluid to flow from the first cylindrical chamber, through the first port 1186, and into the annular chamber 1166. In some embodiments, the second valve 1168 may permit fluid to freely flow through the first port 1186 from the annular chamber 1166 into the first cylindrical chamber 1160. In some embodiments, the second valve 1194 may permit the substantially incompressible fluid to flow from the annular chamber 1166, through the first port 1186 and into the first cylindrical chamber 1160 when pressure or force from the incompressible fluid in the annular chamber 1166 exceeds any necessary force threshold within the second valve 1194. In some embodiments, features of the second valve 1194 may extend beyond the exterior surface 1190 of the second end 1104 and may be manipulable by the user via a knob or other structure 1196 to adjust the pressure at which the substantially incompressible fluid may flow through the first port 1186 from the annular chamber 1166 to the first cylindrical chamber 1160. In some available positions of the adjustment structure 1196, the necessary pressure to open the second valve 1194 may be, or may approach, zero. Using this structure, the second valve 1194 may restrict flow in only one direction. In some embodiments, the valve 1194 may be a controllable plain orifice valve in the direction from the annular chamber 1166 to the first cylindrical chamber 1160 and may be a controllable sprung valve in the direction from the first cylindrical chamber 1160 to the annular chamber 1166.

After reaching the annular chamber 1166, the substantially incompressible fluid may be permitted to flow without restriction between the annular chamber 1166 and the second cylindrical chamber 1162. The fluid may then flow through a second port 1174 into the third cylindrical chamber 1164. The second port 1174 may be blocked by a third valve 1176, like the illustrated resilient o-ring, or any other structure deemed appropriate by a person having ordinary skill in the art. When the force or pressure of the incompressible fluid in the second cylindrical chamber 1162 exceeds the threshold pressure of the third valve 1176, the substantially incompressible fluid may flow through the second port 1174 past or through the third valve 1176 and into the third cylindrical chamber 1164. This fluid flow from the first cylindrical chamber 1160, through the first and second valves 1168 and 1194, into the annular chamber 1166, into the second cylindrical chamber 1162, and into the third cylindrical chamber 1164 may be most likely to occur during a compression stroke as the piston 1112 moves into and reduces the size of the first cylindrical chamber 1160 and simultaneously enlarges the third cylindrical chamber 1164. In some embodiments the third valve 1176 may be a weakly sprung valve in the direction from the second cylindrical chamber 1162 to the third cylindrical chamber 1164, and the valve 1176 may substantially prevent or block flow from the third cylindrical chamber 1164 to the second cylindrical chamber 1162.

During the rebound stroke, the substantially incompressible fluid may move through a third port 1178, which may permit fluid to flow between the third cylindrical chamber 1164 and the annular chamber 1166. The damping chamber 1110 may include a fourth valve 1171, which may include a restricting element 1172 and a valve adjuster 1170 that may control restriction of fluid flow through the third port 1178. In some embodiments, the restricting element 1172 controlled by the valve adjuster 1170 may be substantially annular and may be positioned within the annular chamber 1166. In some embodiments, the restricting element 1172 may be a sleeve. In some embodiments, features of the restricting element 1172 may extend beyond the exterior surface 1190 of the second end 1104 and may be manipulable by the user via a knob or other structure 1182 to adjust the pressure at which the substantially incompressible fluid may flow from the first cylindrical chamber 1160 to the annular chamber 1166. The rotation of the knob 1182 may rotate the adjuster 1170 to impinge on a tongue 1184 that may extend into the annular chamber 1166. Movement of the tongue 1184 may cause contact between the tongue 1184 and one end 1188 of the restricting element 1172, thereby moving the restricting element 1172 longitudinally within the annular chamber 1166. However, it is often desirable that the restricting element 1172 be permitted to move longitudinally within the annular chamber 1166 other than using the tongue 1184. For example, substantially incompressible fluid moving from the first cylindrical chamber 1160 to the second cylindrical chamber 1162 may impinge on the first end 1188 of the restricting element 1172 and thereby may move the restricting element longitudinally towards the second cylindrical chamber 1162. Similarly, fluid flowing from the second cylindrical chamber 1162 to the first cylindrical chamber 1160 may impinge on the second end 1190 of the restricting element 1172 and thereby may move the restricting element 1172 longitudinally towards the tongue 1184. The position of the restricting element 1172 relative to the third port 1178 may affect the fluid flow from the third cylindrical chamber 1164 to the annular chamber 1166 and into the first cylindrical chamber 1160.

The third port 1178 may be positioned so as only to be available for fluid flow for certain positions of the second piston 1112. In many embodiments, it may be undesirable for fluid in the first cylindrical chamber 1160 to be permitted to flow into the annular chamber 1166 through a port other than the first port 1186. Further, in many embodiments, it may be desirable for substantially incompressible fluid within the third cylindrical chamber 1164 to act as a stop and minimize or prevent the second piston 1112 from "topping out" or reaching the structure 1192 defining the second port 1174. Accordingly, the third port 1178 may be positioned such that it is available for fluid flow only when it is longitudinally between the second piston 1112 and the second port defining structure 1192 or longitudinally between the first piston 1108 and the second piston 1112. By so positioning the third port 1178, the first piston 1108, the structure 1192 defining the second port 1174, and the second piston may remain longitudinally spaced from one another during any stroke of the suspension system.

During a compression stroke, the first end 1102 and the second end 1104 may telescopically slide towards one another. The first piston 1108 may move into the gas spring chamber 1106. This motion of the first piston 1108 may increase the pressure in the gas spring chamber 1106. This pressure increase may increase the pressure of the gas in the gas spring chamber against the first side 1122 of the floating piston 1120. At the same time, the second piston 1112 may move into the damping chamber 1110. The movement of the second piston 1112 may cause the opening of the first valve 1168 as described above to create a damping of the movement of the shock absorber 1100. The movement of the fluid within the damping chamber 1110 and its related chambers may be further affected by the pressure applied by the gas in the gas spring chamber 1106 to the floating piston 1120. The pressure against, and movement of, the floating piston 1120 may resist movement of the substantially incompressible fluid within the damping chamber 1110. Similarly, during a rebound stroke, pressure may continue to be applied to the substantially incompressible fluid in the damping chamber 1110 through the force on the gas in the gas spring chamber 1106 and the floating piston 1120. The pressure applied by the gas in the gas spring chamber 1106 to the floating piston 1120 may minimize or prevent vacuum bubbles from forming in the fluid of the damping chamber 1110 in the same way as described for the embodiment of FIG. 10, above. Likewise, varying the gas pressure in the gas chamber 1106 may vary the tension on the seal 1118 of the floating piston 1120 that may be overcome in order to allow compressive movement of the shock absorber 1100, also as described for the embodiment of FIG. 10. In this manner, gas pressure from the gas spring chamber 1106 may be used to and may affect the damping of the shock movement.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A shock absorber for a vehicle, comprising:
 a first end;
 a second end being configured to telescopically slidingly interfit with the first end and at least partially defining a chamber containing a fluid and comprising at least a first cylindrical chamber, an additional chamber, and an annular chamber;
 a first port permitting the fluid to flow between the first cylindrical chamber and the annular chamber;
 an additional port permitting the fluid to flow between the additional chamber and the annular chamber; and
 a valve controlling restriction of the flow through the additional port, wherein the valve comprises at least a restricting element and an adjuster.

2. The shock absorber according to claim 1, wherein at least a portion of the adjuster extends beyond an exterior surface of the second end.

3. The shock absorber according to claim 1, wherein the valve comprises an annular sleeve.

4. The shock absorber according to claim 3, wherein the annular sleeve is positioned in the annular chamber.

5. The shock absorber according to claim 4, wherein the annular sleeve is permitted to move longitudinally within the annular chamber.

6. The shock absorber according to claim 1, further comprising a first piston and a second piston longitudinally spaced from one another.

7. The shock absorber according to claim 6, wherein fluid flow through the additional port is permitted when the additional port is longitudinally between the first piston and the second piston.

8. The shock absorber according to claim 1, further comprising a further cylindrical chamber in fluid communication with the annular chamber.

9. The shock absorber according to claim 8, further comprising structure defining a further port between the further cylindrical chamber and the additional chamber.

10. The shock absorber according to claim 9, wherein fluid flow through the additional port is permitted when the additional port is longitudinally between the first piston and the second piston.

11. The shock absorber according to claim 6, wherein the first piston is positioned within the first end.

12. The shock absorber according to claim 6, wherein the second piston is positioned within the second end.

13. The shock absorber according to claim 6, further comprising a floating piston between the first piston and the second piston.

14. The shock absorber according to claim 13, wherein the floating piston is a floating barrier that separates the gas in the gas spring chamber from the substantially incompressible fluid in the damping chamber and is configured to move to equalize the pressure between the gas in the first end and the substantially incompressible fluid in the second end.

15. The shock absorber according to claim 14, wherein the pressure from the gas against the floating piston is adequate to minimize cavitation.

16. The shock absorber according to claim 14, wherein a gas spring chamber is positioned within the first end.

17. The shock absorber according to claim 14, wherein a damping chamber is positioned within the second end.

* * * * *